United States Patent [19]

Shimada et al.

[11] 3,817,107

[45] June 18, 1974

[54] SEMICONDUCTOR PRESSURE TRANSDUCER

[75] Inventors: Satoshi Shimada; Taisaki Kozuma, both of Hitachi; Ichiro Kimura, Mito, all of Japan

[73] Assignee: Hitachi, Ltd., Tokyo, Japan

[22] Filed: Sept. 29, 1972

[21] Appl. No.: 293,508

[30] Foreign Application Priority Data
Sept. 29, 1971 Japan.............................. 46-76346

[52] U.S. Cl............................... 73/398 AR, 338/4
[51] Int. Cl. ............................................... G01l 9/04
[58] Field of Search...... 73/398 AR, 88.5 SD; 338/4

[56] References Cited
UNITED STATES PATENTS
| | | | |
|---|---|---|---|
| 3,247,719 | 4/1966 | Chelner | 73/398 AR |
| 3,662,312 | 5/1972 | Thorp | 73/398 AR |
| 3,712,143 | 1/1973 | Weaver et al. | 73/398 AR |

*Primary Examiner*—Donald O. Woodiel
*Attorney, Agent, or Firm*—Craig and Antonelli

[57] ABSTRACT

In a semiconductor pressure transducer including an insulating support member having a perforation at its center and provided with terminal pins hermetically mounted therein for connection to an external circuit and a silicon diaphragm having strain gages provided in the surface thereof and so attached to the insulating support member as to seal the perforation of the member, the terminal pins and the silicon diaphragm are integrally formed with the insulating support member to facilitate a wiring operation in the manufacturing process, the strain gages are located on the pressure receiving side, the terminals of the strain gages with which lead wires are connected and the tops of said terminal pins are arranged substantially at the same level above the support member, and thereafter the terminals are connected through lead wires with the tops of the pins.

16 Claims, 9 Drawing Figures

SEMICONDUCTOR PRESSURE TRANSDUCER

BACKGROUND OF THE INVENTION

1. Field of the Invention

The present invention relates to a pressure transducer which converts input pressure into strain and further into electrical signal, amplifies the electric signal and delivers as an output the amplified electric signal, and more particularly to a transducer using semiconductor for its pressure-strain converting part.

2. Description of the Prior Art

In a conventional pressure transducer, lead wires having a diameter of several tens of microns must be connected with the terminals of the strain gages in the transducer through hot-press bonding or supersonic welding and then with the terminal pins to be connected with the external circuit. Such a wiring operation must be performed within a small space and will be very difficult. Moreover, since individual parts are miniature, a special artifice is required in the wiring operation. As a result, the completed transducer becomes expensive and that with a poor reliability.

SUMMARY OF THE INVENTION

One object of the present invention is to provide a semiconductor pressure transducer having a high production efficiency and reliability.

In order to attain such an object, the terminal pins and the silicon diaphragm are integrally formed with the insulating support member to facilitate a wiring operation in the manufacturing process, and the terminals of the diffusion type strain gages and the tops of the pins provided in the support member are located substantially at the same level. There can be proposed here two kinds of diffusion type strain gages: one is a P-type strain gage formed in an N-type substrate and the other an N-type strain gage formed in a P-type substrate.

The former type has a better strain-resistance characteristic (the linearity of the variation in the resistance with the generated strain). However, in this case, if the support member is made of metal, the PN junctions formed between the P-type strain gages and the N-type substrate are forward-biased by a voltage applied to the lead wires connected with the strain gages so that a sufficient insulation cannot be obtained. Therefore, when an N-type substrate (i.e. semiconductor diaphragm of Si or Ge in this invention) is attached to a metal support, a binder having a good insulating property such as plastics or glass should be used.

The layer of the plastic or glass binder, however, must be rather thick so as to establish sufficient insulation whereas the binding force decreases with the increase in thickness.

It is, therefore, a second object of the present invention to provide those structures of the support member and the semiconductor diaphragm which assure both an excellent insulation between the support and the diaphragm and an efficient operation of bonding them.

In order to attain the second object described above, it is necessary to attach an N-type silicon diaphragm having therein P-type strain gages to a silicon support member having therein a PN junction with Au-Si eutectic alloy as binder. With this constitution, the problems of characteristic and insulation can be solved at the same time.

In a transducer using miniature semiconductor parts, the method of protecting the parts and the lead wires connecting the parts one with another, is responsible for most of faults. And, when the pressure transducer is coupled to the pipe through which a fluid to be measured is introduced into the transducer, the zero point of the strain gages is slightly varied due to the strain caused in the coupling operation.

Moreover, the conventional pressure transducer has a disadvantage that the lead wires and bonded parts are easily broken by mechanical impacts.

A third object of the present invention is to eliminate such a disadvantage and to provide a semiconductor pressure transducer stable against mechanical impacts. In order to attain the third object described above, the terminals of the strain gages provided in the silicon diaphragm are so provided as to extend outside the perforation of the support member so that the lead wires connected with the terminals may not experience distortion due to applied pressure.

A fourth object of the present invention is to provide a semiconductor pressure transducer which can be used for the measurement of both the absolute and gage pressure. In order to attain the last object of the present invention, a specific chamber is provided which can be evacuated, hermetically sealed and communicated with the atmosphere.

DESCRIPTION OF THE PREFERRED EMBODIMENTS

Figure 1:
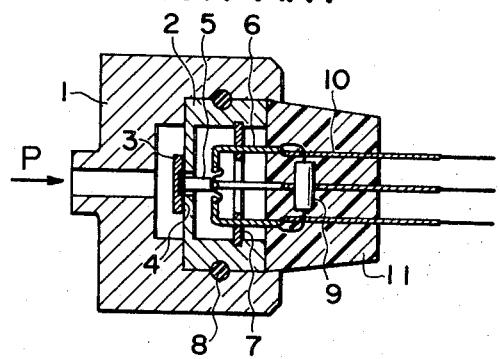
FIG. 1 shows a conventional pressure transducer in longitudinal cross section.
Figure 2A:
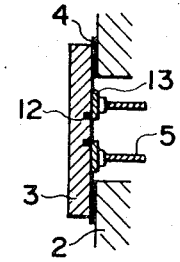
FIGS. 2a and 2b show the silicon diaphragm used in the transducer shown in FIG. 1, on magnified scale, in its cross sectional and front views, respectively.
Figure 2B:
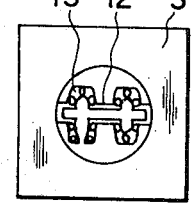

In FIGS. 1, 2a and 2b, which show a conventional pressure transducer and the silicon diaphragm used therein, a flange member 1 having a pressure receiving opening surrounds a support member 2, to which a silicon diaphragm 3 is bonded with a fusing material 4 such as glass. Lead wires 5 connect terminal pins 6 with the terminals 13 of strain gages 12 provided in the silicon diaphragm 3. A resin plate 7 fixes the terminal pins 6 to the support member 2 and has a perforation at its center, through which wire bonding work is performed. A ring 8 serves to seal the support member 2 and the flange member 1. A compensating element 9 is incorporated in this transducer so as to compensate for the circuits of the diffusion type strain gages 12. A resin base 11 rigidly unites external lead wires 10, the compensating element 9 and the terminal pins 6 into a single block. Terminals 13 of the strain gages 12 may be made of vapor-deposited layer of, for example, aluminum. The conductivity type of the body of the strain gage 12 is made opposite to that of the substrate of the silicon diaphragm 3 so as to assure insulation between them. With the constitution described above, an applied pressure varies the resistance of the strain gage provided in the silicon diaphragm due to piezoresistance effect so that the intensity of the applied pressure is to be detected by measuring the variation of the resistance.

However, in the structure of the prior art pressure transducer shown in FIGS. 1, 2a and 2b, lead wires 5, which usually have a diameter of several tens of microns, have to be connected with the terminals 13 of the strain gages 12 through hot-press bounding or supersonic welding and then with the terminal pins 6. Such a wiring work must be performed within a small space and therefore has a poor efficiency. Moreover, if the pressure transducer is made of semiconductor, all the parts are usually miniaturized. Accordingly, the wiring work will become more elaborate so that the difficulty in the manufacturing process will adversely affect not only the production cost but also the reliability of the resulting device.

Now, reference should be made to FIGS. 3, 4a, 4b and 4c which respectively show a pressure transducer embodying the present invention in its longitudinal cross section and the silicon diaphragm used in the transducer, with strain gages provided therein and associated wirings, in its front, cross sectional and rear views. The same reference numerals used in these figures are applied to like parts or elements as in FIGS. 1 and 2.

Figure 3:
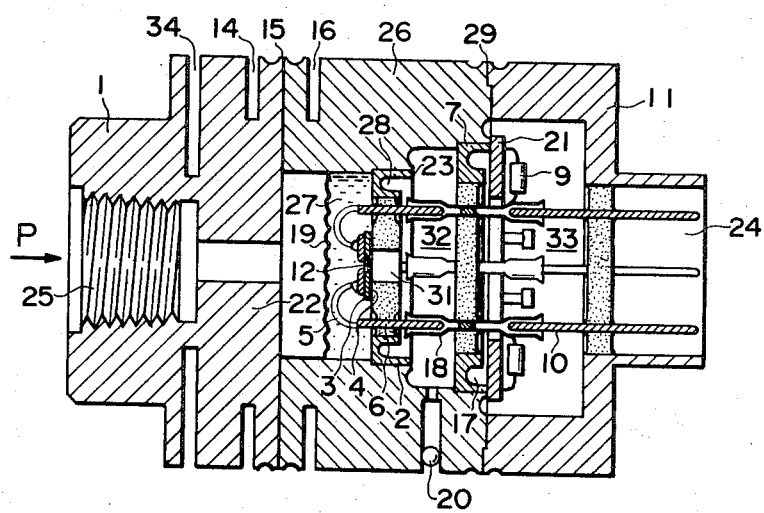
FIG. 3 shows in longitudinal cross section a pressure transducer as one embodiment of the present invention.
Figure 4A:
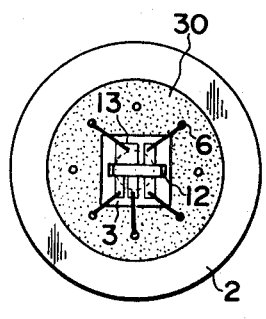
FIGS. 4a, 4b and 4c show the silicon diaphragm used in the transducer shown in FIG. 3, on magnified scale, in its front, cross sectional and rear views, respectively.
Figure 4B:
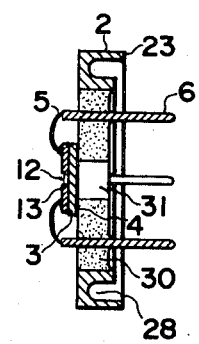
Figure 4C:
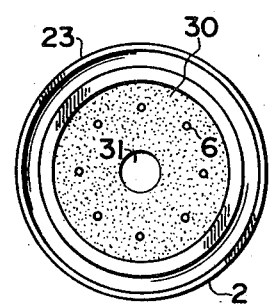

In FIGS. 3 and 4, a flange member 1 has an internally threaded bore 25 into which an externally threaded pressure transfer pipe (not shown) is fitted. A circumferential groove 34 is provided to absorb a distortion due to the deformation of the flange member 1 caused when it is mounted on the pressure transfer pipe. The flange part 22 of the member 1 and the casing 26 of the transducer are arc-welded together along a circumferential ridge 15. Circumferential grooves 14 and 16 are provided to absorb distortion due to welding. A seal diaphragm 19 is inserted and arc-welded between the flange part 22 and the transducer casing 26. An oil chamber 27 constituted of a diaphragm support 2 and the seal diaphragm 19 contains, for example, silicon oil hermetically. The diaphragm support 2 has at its center a perforation 31 through which pressure is transferred to a silicon diaphragm 3 so provided as to cover the perforation 31. Pins 6 are embedded in the support 2 at their one ends. The support 2 is arc-welded with the casing 26 along a circular protrusion 23, with the provision of which welding having small thermal energy is to be utilized and distortion due to welding can be absorbed by a groove 28. The silicon diaphragm 3 is rigidly attached to the diaphragm support 2 by means of, for example, fused Au-Si alloy. The terminals 13 of the strain gages 12 provided in the silicon diaphragm 3 are connected with the pins 6 by lead wires 5 through hot-press bonding or supersonic welding. A welding piece of the hermetic terminal 7 having a groove 17 to absorb distortion due to welding, is welded with the body 26 of the transducer. Slitted tubular sleeves 18 supported by the welding piece of the hermetic terminal 7 receive at their one ends the pins 6 located by the support 2. The contacting surfaces of the sleeves 18 and the pins 6 are coated with gold film so as to reduce the contact resistance and, if necessary, may be coated with solder layer so that the pins 6 and the sleeves 18 may be soldered together through heating after they are engaged with each other. The support 2 and the welding piece of the hermetic terminal 7 define a chamber 32 which is communicated with or separated from atmosphere by means of a steel ball 20 so that the transducer may be used to measure both atmospheric and absolute pressures. A printed-circuit unit 21 comprises a compensating element to compensate for the circuits of the strain gages in the silicon diaphragm 3 and an amplifying circuit 9. A case 11 is arc-welded with the transducer casing 26 along circumferential ridge 29 to define a hermetic protecting chamber 33 for protecting the print circuits from atmospheric errosion. A sealing plate 24 fixes pins 10 hermetically, which are inserted into the sleeves 18 supported by the welding piece of the hermetic terminal 7.

Now, input pressure introduced into the flange member 1 acts on the seal diaphragm 19 to increase the pressure of the oil in the oil chamber 27 so that a distortion is created in the silicon diaphragm 3. The generated distortion is converted into the variation in the resistance of the strain gage provided in the silicon diaphragm, fed through the pins 6, the sleeves 18 and the pins 10, and delivered at the external terminals 24. The diffusion type strain gage is interconnected with the printed circuit units 21 in the Wheatstone bridge configuration so as to increase an output sensitivity and the bridge is balanced by means of the compensating element. The resistance variation is then converted to a standard electrical signal of 0 to 16 mA through the amplifier 9 and fed to the succeeding stages.

The pressure transducer according to the present invention having such a structure as described above can enjoy the following merits and effects.

Since the terminals of the strain gages in the silicon diaphragm and the head portions of the pins for taking out lead wires can be located at the same level above the surface of the support member, the working of wire bonding is much more simplified than in case of the prior art transducer shown in FIGS. 1 and 2. Moreover, since the connection between the terminals inside and outside the support 2 is made in the fashion of a connector, complicated wiring work can be avoided so that wiring operation efficiency is improved. Therefore, the first object of the present invention can be attained with a simple constitution according to the inventors' proposal. It should here be noted that in order to facilitate the connection of the lead wires with the pins 6, the top surfaces of the strain gage terminals on the silicon diaphragm attached to the support are at the same level as or slightly higher than the height of the pins 6.

The support member according to the present invention is made of glass, ceramics or metal having the same coefficient of linear expansion as the silicon diaphragm, and has at its center a perforation 31 made through supersonic treatment or sand-blast method which perforation determines the diameter of the pressure receiving area of the silicon diaphragm. The pins 6 for drawing out lead wires 5 are also located during the formation of support member.

In case where a support member made of silicon having a high resistivity, an N-type silicon diaphragm and a P-type strain gage are employed, the silicon diaphragm and the support member can be jointed together with Au-Si eutectic alloy having a strong bonding force. The electric insulation between the strain gage and the transducer casing can therefore be assured by the high resistance of the silicon support. Thus, the second object of the present invention is easily attained. Moreover, in case where the bonding of a silicon diaphragm and a glass support member with gilded area to which the diaphragm is attached, is made by forming Au-Si eutectic alloy in the boundary between the gold film and the silicon diaphragm, the support member and the diaphragm are insulated from each other with a portion of the support devoid of the gold film.

Therefore, in this case also, the second object of the present invention is attained. In case where a metal support of, for example, Fanico (trade name) is employed, an insulating film has to be previously formed through, for example, vapor-deposition only on the area of the support where the silicon diaphragm is attached and then a gold film has to be formed on the insulating film so that the silicon diaphragm and the gold film are joined together with the Au-Si eutectic alloy formed therebetween. When glass is used as an insulating binder, the support may be made of either metal or non-metal. When a metal support is used, a glass layer has to be previously formed on the surface of the metal support in order to facilitate the bonding of the support and the diaphragm.

Moreover, according to the present invention, the N-type silicon diaphragm 3 is attached to the support member 2 in such a manner that the surface of the diaphragm 3 where the P-type strain gages are not formed is in contact with the support member and the area of the terminals 13 is made larger than that of the perforation 31 so that the lead wires 5 may be connected with the terminals in the area where input pressure generates no distortion. Namely, the terminals 13 of the strain gage 12 provided in the silicon diaphragm 3 is extended to the non-distorting bonded portion of the diaphragm 3 with the aid of vapor-deposited metal electrodes and wires 5 connect the ends of the electrodes with the pins 6. With this configuration, no force is applied to the bonded wires 5 which are connected with the strain gage terminals 13 at the non-distorting bonded portion, even when pressure is repeatedly applied to the diaphragm 3. Consequently, the breaking of the wires 5 is prevented.

As seen in FIG. 3, the wall of the transducer casing 26 is made thicker so as to obtain sufficient rigidity while the circumferential groove 34 is provided in the flange member 1 so as to obtain flexibility. With this structure, the distortion caused in the flange member 1 when the flange member 1 is threadedly connected with the pressure transfer tube, is absorbed by the groove 34 and therefore prevented from being transferred to the transducer casing 26. Thus, the variation in the zero point of the strain gage due to such a distortion as described above can be prevented. The distortions caused due to the operations of welding and assembling are absorbed in like manner by means of the grooves 14, 16, 17 and 28. Moreover, the semiconductor strain gage is located in the oil chamber which is filled with highly viscous oil and the partition wall of which is made of the seal diaphragm 19 having a low rigidity. So, the oil serves not only as a pressure transfer medium to transfer the applied pressure from the seal diaphragm 19 to the silicon diaphragm 3 but also as a buffer means to prevent the applied mechanical shock and vibration from directly acting on the connecting wires 5 due to the damping effect of the highly viscous oil. Therefore, the wires 5 can be protected from the pressure mechanical shock and vibration so that the breaking of them is prevented.

Thus, with the configuration described above, the distortions caused during the fabrication, installation and operation of the transducer can be easily eliminated, as is the third object of the present invention.

Moreover, with the conventional pressure transducer as shown in FIG. 1, the binder 4 is brought into contact with a fluid whose pressure is to be measured and there arises a probability that the binder may react chemically on the fluid and be erroded. As a result of this, the kinds of measurable fluids are limited. On the other hand, according to the present invention, the fluid to be measured gets into contact with the seal diaphragm and if a corrosion-resisting material is used as the seal diaphragm, a variety of fluids can be introduced into the pressure transducer without the danger of corrosion. In addition to this, the lead wires 5, the pins 6 and the strain gages are all immersed in the oil 27 and therefore isolated from atmosphere so that the deterioration of the strain gage is prevented and the strain gage will exhibit a stability during a long time operation.

The standard pressure is that in vacuum when the absolute pressure is measured or the atmospheric pressure when the gage pressure is measured.

In the conventional transducer shown in FIG. 1, the strain gage is isolated from atmosphere by the resin base 11 so that the strain gage suits for the measurement of absolute measurement. If it is required to measure the atmospheric pressure with this pressure transducer as it is, the chamber housing the resin plate 7 must be communicated with the atmosphere. Consequently, the stability of the strain gage is degraded since it cannot be protected from the atmospheric corrosion and moisture. On the other hand, according to the transducer of the present invention, as shown in FIG. 3, the surface of the diaphragm 3 where the strain gage is not formed gets in contact with the atmosphere by communicating the chamber 32 with the atmosphere by shifting the steel ball 20 when the gage pressure is to be measured, while the strain gage is always immersed in the oil 27. Accordingly, there is caused no such difficulty as mentioned above with the conventional transducer even when the pressure measurement on the basis of the atmospheric pressure is performed. And, if the chamber 32 is evacuated and sealed by the steel ball 20, the transducer gets ready for the measurement of absolute pressure. Thus, the transducer according to the present invention can be easily adapted for the measurements on the basis of both the atmospheric and the absolute pressures only by controlling the steel ball 20 and without any further special device. Thus, the fourth object of the present invention can be easily attained.

Figure 5A:
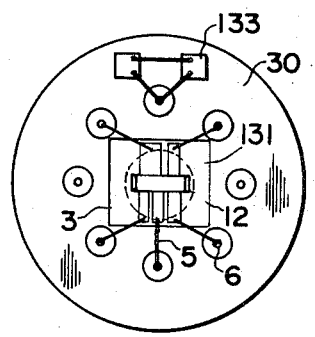
FIGS. 5a and 5b show a silicon diaphragm assembley as another embodiment of the present invention in its front and cross sectional views.
Figure 5B:
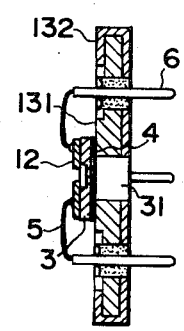

Now, description will be made of FIG. 5 which shows the detailed structure of the semiconductor support member used in the pressure transducer according to the present invention. Two regions of different conductivity types such as, for example, an n-type region 131 and a p-type region 132 are formed in a silicon plate 30 to form a PN junction which is oppositely directed with respect to the current path from the strain gage 12 to the silicon plate 30. This PN junction prevents any leakage current from the strain gage 12 to the casing 26 of the transducer even when the silicon plate 30 is attached to the casing 26 by means of such a conductive binder as Au-Si eutectic alloy. In order to reduce the overall size of the completed transducer, a compensating element for compensating for the circuit of the strain gage 12 and a part 133 of the electronic elements of an amplifier such as a constant voltage, constant current circuit are provided on the silicon plate 30 in the vicinity of the strain gage 12 through integrated circuit technique. This circuit 133 serves not only to adjust the zero point of the bridge circuit constituted of the strain gages 12 and their associated circuits but also to compensate for the variations in the zero point or the sensitivity due to temperature change. With the construction described above, even if there is a sudden change in the temperature of the fluid to be measured, the strain gages 12 and the compensating element will be kept at almost the same temperature due to their vicinity of each other. Consequently, the transient response characteristic of the output due to the external thermal disturbance can be improved.

The above described integrated circuit 133 can be provided either by diffusing impurities into the silicon diaphragm or the silicon support member or by attaching a separately formed integrated chip to the support member.

If the silicon diaphragm provided with diffusion type strain gages is attached to the silicon support member by means of a binder of Au-Si eutectic alloy, a complete insulation can be obtained irrespective of the conductivity types of the strain gages. Therefore, use can be made of the characteristic of either p-type or n-type strain gage so that a pressure transducer having a good insulation property and linearity can be obtained.

Moreover, wires are connected with the part of the diaphragm 3 where there is caused mo distortion so that the wire bonding operation is facilitated and at the same time the breaking of the wires due to the repeated application of pressure can be prevented.

Therefore, the present invention is characterized in that the material of the diaphragm having semiconductor strain gages provided therein has the same coefficient of linear expansion as that of the support member and that the electronic parts for an amplifier and the compensating element to compensating for the bridge circuit are provided on a plate 21 through printed circuit technique. Accordingly, the bonding of the silicon diaphragm and the support member is almost integral and permits no pressure leakage. Moreover, since the compensating element and the electronic parts are housed in the protective chamber 33, they are protected from atmospheric errosion. And since the electronic 9 parts which are separated from the pressure receiving part in the prior art system can be provided on the plate 21 through integrated circuit technique, the overall size of the completed transducer can be reduced.

The resistances and resistance-temperature coefficients between any two individual strain gages must be balanced and, therefore, the chip in which the strain gages are formed by the diffusion of impurity and the substrate on which the integrated circuit is formed should be separately completed and thereafter assembled together in order to prevent the fault of the transducer due to only one of the chip and the substrate being in trouble. In addition, the cost of the integrated circuit can be lowered when the mass production system is employed.

We claim:

1. A semiconductor pressure transducer comprising:

a housing having a pressure introducing port, an insulating support member secured in said housing with a surface facing said port, said support member having a perforation through the port facing surface, and said support member having a plurality of pins hermetically mounted through said support member in surrounding relation to said perforation with first ends extending from the port facing surface of said support member, and second ends connected to an external circuit, silicon diaphragm means attached to said port facing surface of said support member for sealing said perforation, diffusion strain gage means formed on said silicon diaphragm means in facing relationship to said port, said straing gage means having terminal portions, said terminal portions and said first ends of said plurality of pins located at substantially the same distance from said port facing surface of said support member, lead means connecting said terminal portions and said ends of said pins, and pressure applying means for transferring pressure from said port to said silicon diaphragm, whereby a distortion of said silicon diaphragm effects a measurement of at least one of an absolute pressure and an atmospheric pressure by said diffusion strain gage means.

2. A semiconductor pressure transducer according to claim 1, wherein said perforation is at the center of said support member.

3. A semiconductor pressure transducer according to claim 1, further comprising an end plate hermetically secured to said housing, said end plate spaced from said support member on a side opposite from said port facing surface, said end plate, said support member and a portion of said housing defining a reference chamber, means for connecting said second ends of said plurality of pins to said end plate, and means for selectively communicating and isolating said reference chamber with the atmosphere so that said pressure measurement is selectively one of an absolute pressure and an atmospheric pressure.

4. A semiconductor pressure transducer as claimed in claim 1, wherein said silicon diaphragm means is N-type silicon and said strain gage means are diffused in said diaphragm as P-type regions and wherein said diaphragm means is attached to said support member with Au-Si eutectic alloy as a binder interposed therebetween.

5. A semiconductor pressure transducer as claimed in claim 1, wherein said silicon diaphragm means is N-type silicon and said strain gage means are diffused in said diaphragm as P-type regions and wherein said diaphragm means is attached to said support member by means of a glass binder.

6. A semiconductor pressure transducer as claimed in claim 1, wherein said silicon diaphragm means is N-type silicon and said strain gage means are diffused in said diaphragm means as P-type regions and wherein said support member is a metal plate coated with an insulating glass film, onto which said silicon diaphragm means is attached by means of a glass binder.

7. A semiconductor pressure transducer as claimed in claim 1, wherein said silicon diaphragm means is N-type silicon and said strain gage means are diffused in said diaphragm means as P-type regions and wherein said support member is a metal plate coated with an insulating film onto which said silicon diaphragm means is attached with Au-Si eutectic alloy as a binder interposed therebetween.

8. A semiconductor pressure transducer as claimed in claim 1, wherein said terminal portions of said strain gage means extend outside the area of said perforation of said support member so that said terminal portions are located within substantially strain-free regions of said silicon diaphragm means.

9. A semiconductor pressure transducer as claimed in claim 1, wherein circumferential grooves are cut along the periphery of said housing to absorb distortion of said housing.

10. A semiconductor pressure transducer as claimed in claim 1, wherein said pressure applying means includes a seal diaphragm spaced from said port facing surface of said support member defining a closed chamber with said support member, and said chamber is filled with highly viscous oil.

11. A semiconductor pressure transducer as claimed in claim 1, wherein a welding piece of a hermetic terminal having sleeves to be connected with said second ends of said pins is further provided at a surface of said support member opposite to said port facing surface.

12. A semiconductor pressure transducer as claimed in claim 11, wherein a bore is cut in said housing between said support member and said welding piece so as to retain therein a ball which can open and close said bore.

13. A semiconductor pressure transducer as claimed in claim 1, wherein said support member is made of a semiconductor and a PN junction which establishes an insulation between said strain gage means and said housing is formed in said semiconductor support member.

14. A semiconductor pressure transducer as claimed in claim 1, wherein an element for compensating for the circuit of a bridge constituted of said strain gage means and electronic parts of an amplifier are further provided at the port facing side of said support member, and wherein said element and electronic parts are connected with said terminal portions of said strain gage means or with said first end of said pins.

15. A semiconductor pressure transducer as claimed in claim 1, wherein said support member is provided with a groove internally along the periphery thereof which serves to absorb distortion.

16. A semiconductor pressure transducer as claimed in claim 9, further comprising a protecting casing which is provided with a plurality of hermetically supported second pins connected with said sleeves, said protecting casing together with said housing of said transducer and said welding piece define a chamber separated from the atmosphere, wherein a plate is attached onto said welding piece of a hermetic terminal in said chamber, said plate carrying thereon an element for compensating for the circuit of a bridge constituted of said strain gage means and electronic parts of an amplifier, and wherein the output of said strain gage means are derived through said first and second plurality of pins and said sleeves.

* * * * *